United States Patent

Ohtomo et al.

[11] Patent Number: 5,819,424
[45] Date of Patent: Oct. 13, 1998

[54] LASER LEVELING DEVICE

[75] Inventors: Fumio Ohtomo; Ken-Ichiro Yoshino, both of Tokyo-to, Japan

[73] Assignee: Kabushiki Kaisha Topcon, Tokyo-to, Japan

[21] Appl. No.: 585,277

[22] Filed: Jan. 11, 1996

[30] Foreign Application Priority Data

Jan. 11, 1995 [JP] Japan .................................. 7-018663
Feb. 17, 1995 [JP] Japan .................................. 7-053374

[51] Int. Cl.⁶ .................................................. G01B 11/26
[52] U.S. Cl. .................................. 33/290; 33/227; 33/228; 33/281; 33/286; 33/DIG. 21
[58] Field of Search ............................. 33/290, 227, 228, 33/281, 282, 283, 285, 286, DIG. 21

[56] References Cited

U.S. PATENT DOCUMENTS

| 3,988,837 | 11/1976 | Benson | 33/286 |
| 4,718,171 | 1/1988 | Schlemmer et al. | 33/290 |
| 4,751,782 | 6/1988 | Ammann | 33/DIG. 21 |
| 4,988,192 | 1/1991 | Knittel | 33/281 |
| 5,519,942 | 5/1996 | Webb | 33/281 |

FOREIGN PATENT DOCUMENTS

| 1366877 | 6/1964 | France | 33/290 |
| 9013002 | 11/1990 | WIPO | 33/290 |

*Primary Examiner*—Christopher W. Fulton
*Attorney, Agent, or Firm*—Nields, Lemack & Dingman

[57] ABSTRACT

The present invention provides a laser leveling device, which comprises a light emitting unit for irradiating a laser beam, a rotating unit for rotating the laser beam for scanning, and a means for turning off the scanning laser beam so that a spotlike is formed in a specific direction. By forming a reference spot light, and aligning an irradiating point of the spot beam with the reference point, it is possible to install the laser leveling device 1 to the reference point and to perform accurate positioning of the laser leveling device by the scanning line of the laser beam formed on a portion other than the spot.

5 Claims, 6 Drawing Sheets

LASER LEVELING DEVICE

BACKGROUND OF THE INVENTION

The present invention relates to a laser leveling device for emitting a laser beam in vertical or horizontal directions to scan and for providing a reference line or a reference plane.

Positioning of a partition in a building or of a fluorescent lamp mounted on a ceiling is performed according to a marking line drawn on the floor, and the position indicated by the marking line is determined by projecting the laser beam by a laser leveling device to ceiling surface, wall surface, etc.

Figure 9:
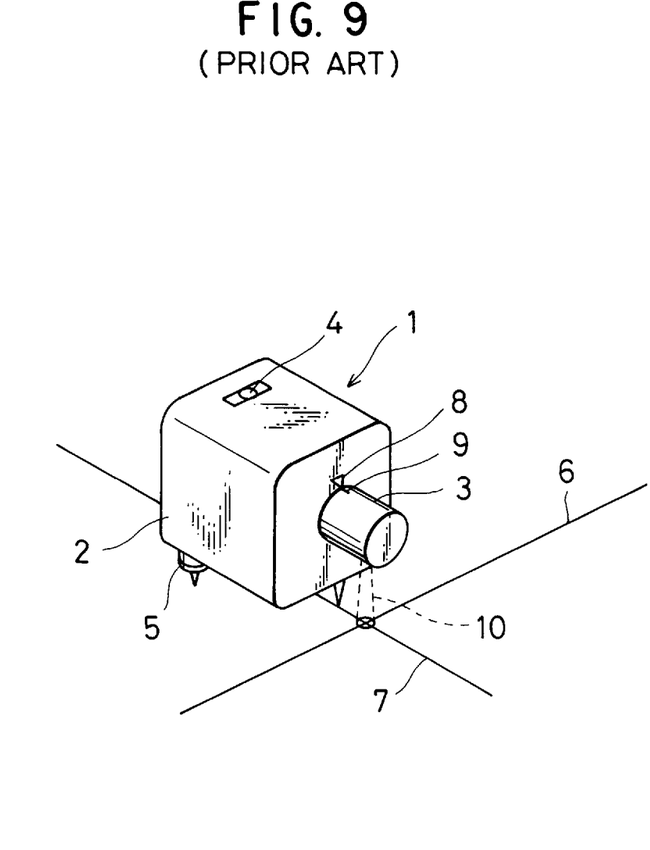
FIG. 9 is an external view of a conventional type device.

Referring to FIG. 9, description will be given on a conventional type laser leveling device, in particular to a laser leveling device 1 for providing a vertical reference line and a vertical reference plane.

A laser leveling device 1 comprises a main unit 2, having a projection system, a control unit, a power supply, etc. incorporated in it, and a rotating unit 3 having a pentagonal prism, rotated around a rotation axis in horizontal direction, on the main unit 2. A laser beam emitted from the projection system in the main unit 2 is emitted in a direction toward the rotation axis and in a direction perpendicular to the rotation axis via the pentagonal prism. By rotating the pentagonal prism on the rotating unit 3, a vertical reference plane is formed. On the top surface of the main unit 2, a bubble tube 4 is arranged, and three legs 5 are mounted on the lower surface of the main unit 2. One of the legs serves as a leveling screw to perform leveling by the laser leveling device 1.

In the past, the operation to perform adequate positioning of the laser leveling device 1 has been carried out as follows:

The laser leveling device is divided into two types: a type, in which the rotating unit 3 itself is rotated, and a type, which is designed in waterproof construction and in which only a rotating portion inside the rotating unit 3 is rotated. In the former type, in which the rotating unit 3 itself is rotated, positioning of the laser leveling device is manually performed by the operator while rotating the rotating unit 3. In the latter type, which has a rotating portion incorporated in the rotating unit 3, the rotating portion cannot be rotated from outside. Therefore, a mechanism must be specially arranged, in which a rotating portion can be rotated mechanically from outside, or another mechanism must be provided, in which a rotating portion can be electrically rotated in normal or reverse directions at low speed by an electric switch.

In the operation for adequate positioning of the laser leveling device, in case it is the device of the type, in which the rotating unit itself is rotated, positioning marks 8 and 9, which coincide with each other when the laser beam 10 is emitted in vertical downward direction from the rotating unit 3, are marked on the main unit 2 and on the rotating portion of the rotating unit 3. The rotating unit 3 is manually rotated to make the positioning marks 8 and 9 coincide with each other so that the laser beam is emitted in vertical downward direction from the rotating unit 3. In case the irradiating point of the laser beam is aligned with a reference point on the floor, e.g. with the point of intersection of the marking lines 6 and 7, and the scanning direction of the laser beam is aligned with the marking line 6, and the rotating portion of the rotating unit 3 is rotated or is reciprocally rotated within a given angular range to align a locus of the laser beam with the marking line 6. In a type of the laser leveling device, in which the laser beam aligned with the rotation axis is emitted from the rotating unit 3, the positioning of the device is performed in such a manner that it is aligned with the point of intersection of the marking lines 6 and 7, and that the irradiation point of the laser beam emitted in the direction of the rotation axis is aligned with a reference point marked on an extension of the marking line 7.

Further, the same applies to a type, in which a rotating portion is provided inside the rotating unit 3. By switching operation, the rotating portion is properly rotated, the laser beam is irradiated in vertical downward direction, and the irradiation point is aligned with the reference point. Then, scanning direction of the laser beam is adjusted.

In the conventional type laser leveling device as described above, the adjusting operation must be done in two steps, i.e. a step to install the device at the reference position and a step to adjust the scanning direction after installing the device while moving the rotating portion. This involves complicated procedure and much working time. In the type of the device, in which the rotating portion is incorporated inside the rotating unit, the rotating portion cannot be rotated from outside. Thus, a mechanism must be provided, in which the rotating portion can be rotated mechanically or electrically in normal or reverse directions. This results in more complicated structure.

SUMMARY OF THE INVENTION

It is an object of the present invention to provide a laser leveling device, by which it is possible to easily install the laser leveling device at a reference position and to adjust the position after installing. It is another object of the present invention to provide a laser leveling device, which has a simplified structure. To attain the above objects, the laser leveling device of the present invention comprises a light emitting unit for irradiating a laser beam, a rotating unit for rotating the laser beam for scanning, and a means for turning off the scanning laser beam so that a spotlike is formed in a specific direction. The present invention also provides a laser leveling device, comprising a light emitting unit for irradiating a laser beam, a rotating unit for rotating the laser beam for scanning, and a means for turning on the laser beam within a given angular range so that a laser marker is formed in a specific direction. The present invention also provides a laser leveling device, comprising a light emitting unit for irradiating a laser beam, a rotating unit for rotating the laser beam for scanning, a means for turning off the laser beam within a given angular range so that a laser marker is formed in a specific direction. The invention also provides a laser leveling device, in which the light turn-off means comprises an angle detector for detecting an angle of the rotating unit, a signal processing unit for issuing an on-off signal of the laser beam based on a signal from the angle detector, and a control unit for performing on-off control of the light emitting unit based on a signal from the signal processing unit. The invention also provides a laser leveling device, in which the laser beam is turned off within a given angular range before and after a specific direction to form a spot light, or a laser leveling device wherein the laser beam is turned off so that a spot is formed in a specific direction, or a laser leveling device wherein the specific direction is at least one of vertical downward direction, vertical upward direction or horizontal direction. The present invention also provides a laser leveling device, in which the light turn-off means is a slit plate having a slit hole for allowing the laser beam to pass and arranged to interrupt the laser beam. The invention also provides a laser leveling device, in which the slit plate is provided in such manner that the slit hole on the slit plate is positioned in vertical upward or downward direction of the rotation axis of the rotating unit. The present invention also provides a laser leveling device, wherein the laser beam is reciprocally scanned within a given angle before and after the formed spot.

DETAILED DESCRIPTION OF THE PREFERRED EMBODIMENTS

Figure 1:
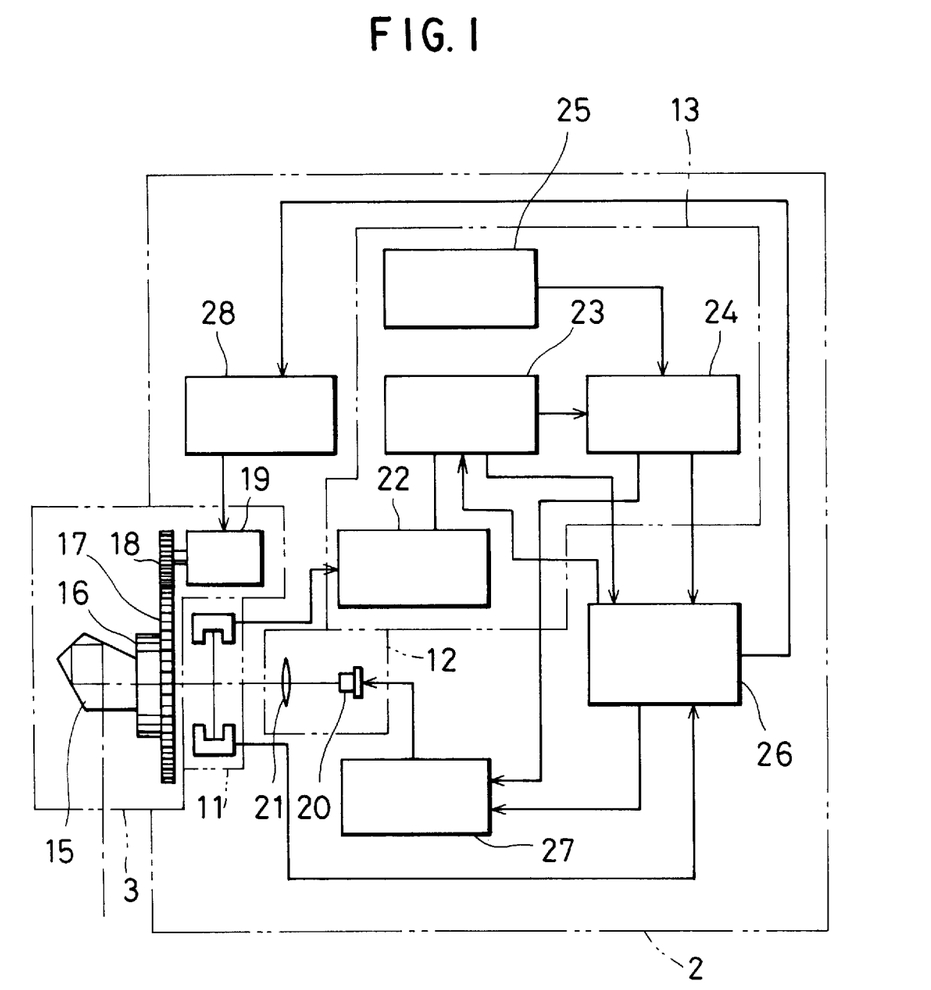
FIG. 1 is a schematical block diagram of an embodiment of the present invention.

FIG. 1 represents a schematical block diagram of an embodiment of the present invention, in which the same component as in FIG. 9 is referred by the same symbol. The reference numeral 2 represents a main unit, and 3 represents a rotating unit. First, description will be given on the rotating unit 3.

On the main unit 2 of the device, a rotation support 16 is rotatably mounted. A pentagonal prism 15 is arranged and a driven gear 17 is concentrically mounted on the rotation support 16. A driving gear 18 on output shaft of a scanning motor 19 is engaged with the driven gear 17.

Next, the main unit 2 is described.

An angle detector 11 for detecting rotation of the rotation support 16 is provided, and a light emitting unit 12 having an optical axis aligned with the rotation axis of the rotation support 16 is arranged. The angle detector 11 comprises a rotating disk and a detector. The rotating disk has angle detecting slits provided over the total periphery at equal angular pitch and a 0-position detecting slit provided only at one point over the total periphery. The detector comprises an encoder for detecting the angle detecting slit and for issuing an angle pulse and an interrupter for detecting the 0-position detecting slit and for issuing a 0 setting signal. The light emitting unit 12 comprises an optical system 21 having a laser diode 20 and a collimator lens, etc. The laser beam emitted from the laser diode 20 is collimated to parallel beams and is emitted toward the pentagonal prism 15 as parallel beams.

The main unit 2 comprises a signal processing unit 13, to which a signal from the angle detector 11 is inputted, and the signal from the signal processing unit 13 is inputted to a control unit 26, e.g. to a CPU. The control unit 26 issues control signals to a light emission control unit 27 to drive the light emitting unit 12 and to a rotation control unit 28 to drive a scanning motor 19 respectively.

Further, the signal processing unit 13 comprises an angle signal processing unit 22, a counter 23, a comparator 24, and a counter reference value setting unit 25. The signal from the angle detector 11 is inputted to the angle signal processing unit 22, which processes the signal, e.g. amplifies the signal, and inputs a pulse signal corresponding to the angle signal to the counter 23. The counter 23 counts the number of pulses from the angle signal processing unit 22, and the number of counts is outputted to the comparator 24 and the control unit 26. The counter reference value setting unit 25 can set the number of pulses as desired, and the numerical value thus set is inputted to the comparator 24. The comparator 24 compares the numerical value set at the counter reference value setting unit 25 with the numerical value from the counter 23. When these two values coincide with each other, a coincidence signal is inputted to the control unit 26. Based on the coincidence signal, the control unit 26 outputs a light emission control signal to the light emission control unit 27 and controls the light emission of the laser diode 20 via the light emission control unit 27. The control unit 26 issues a rotation control signal to the rotation control unit 28 and controls the rotation of the scanning motor 19 via the rotation control unit 28.

In the following, description will be given on operation of the device referring to FIG. 2.

The parallel laser beam emitted from the light emitting unit 12 is deflected in a direction perpendicular to optical axis by the pentagonal prism 15 and is emitted from the rotating unit 3. The pentagonal prism 15 is rotated by the scanning motor 19 via the driving gear 18 and the driven gear 17. By the scanning of the laser beam emitted through the pentagonal prism 15, a vertical reference plane is formed by the laser beam.

The 0 set signal from the interrupter of the angle detector 11 is set in such manner that the laser beam is emitted in a direction by a given angle ahead, e.g. by 30° ahead, from the position where laser beam is emitted in vertical downward direction. The 0 set signal is inputted to the counter 23 via control unit 26.

When the 0 set signal is inputted to the counter 23, the count value on the counter 23 is set to 0. On the comparator 24, a first preset count value corresponding to an angle slightly smaller than 30°, and a second preset count value corresponding to, or to an angle slightly larger than 30°, and a third preset count value corresponding to 60° are inputted respectively by the counter reference value setting unit 25.

When the 0 set signal is inputted to the control unit 26 by the counter 23, a light turn-off signal is issued to the light emission control unit 27, and light emission from the laser diode 20 is stopped. The comparator 24 compares the signal from the counter 23 with the preset value from the counter reference value setting unit 25. When the number of counts coincides with the first preset count value, a first coincidence signal is issued to the control unit 26. Based on the first coincidence signal, the control unit 26 issues a light emission control signal to the light emission control unit 27, and the laser beam is emitted from the light emitting unit 12.

Next, the comparator 24 issues a second coincidence signal to the control unit 26 when the signal from the counter 23 coincides with the second preset count value. Based on the second coincidence signal, the control unit 26 issues a control signal to the light emission control unit 27 and stops light emission from the light emitting unit 12. Further, the comparator 24 issues a third coincidence signal to the control unit 26 when the number of counts coincides with the third preset count value. Based on the third coincidence signal, the control unit 26 emits the laser beam from the light emitting unit 12 via the light emission control unit 27.

Figure 2:
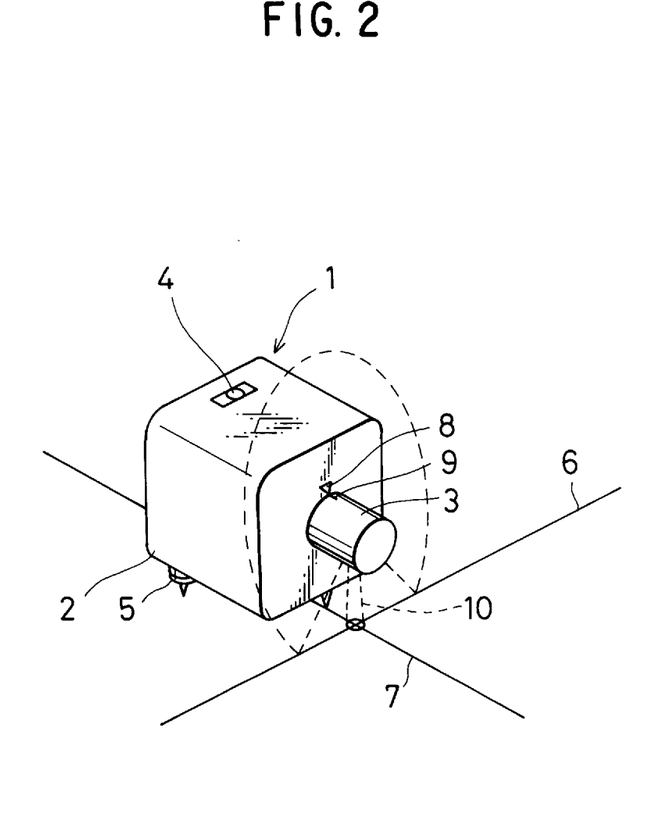
FIG. 2 is an external view of the above embodiment.

As shown in FIG. 2, laser beam is emitted in spot-like manner in vertical downward direction. The light is turned off within a given angular range (30° in the above embodiment) from the vertical downward direction. Thus, a vertical reference plane is formed in the remaining range.

To easily install the laser leveling device 1, the spot light is aligned with the point of intersection of the marking lines 6 and 7 under the above light emitting condition, and the locus on the floor as effected by scanning of the laser beam is aligned with the marking line 6. No special operation, such as stopping of the rotation of the rotating unit 3 or the rotation at low speed, is required to install the laser leveling device 1.

It is needless to say that the angle for turning off the laser beam is not limited to 30°. In the above embodiment, the light is turned off before and after except a part in vertical downward direction, while light may be turned off only in a part in vertical downward direction. The direction of the formed spot light is not limited to vertical downward direction, and it may be in vertical upward direction or in horizontal direction. Or, it may be directed simultaneously or selectively in four directions including vertical upward direction and horizontal direction. The formed spot may be a point, a line segment having a given length, or a laser maker (index marker).

Further, laser beam is rotated over total peripheral direction for scanning in the above embodiment, while it may be reciprocally scanned within a given angle, e.g. within the range of 30°, before and after the predetermined range, e.g. the formed spot, or an inversion signal may be issued to invert when the number of pulses from the signal processing unit 13 reaches a given number so that reciprocal scanning can be performed within the predetermined range.

By reciprocal scanning within the limited range, the luminance of the spot increases, and this contributes to easier visual confirmation.

In the above embodiment, the light is turned off before and after the reference point of the scanning laser beam to form the spot light to irradiate the reference point. In the embodiment described below, light is mechanically (physically) interrupted before and after the reference point to form the spot light.

Description will be given now, referring to FIGS. 3 to 8.

Figure 3:
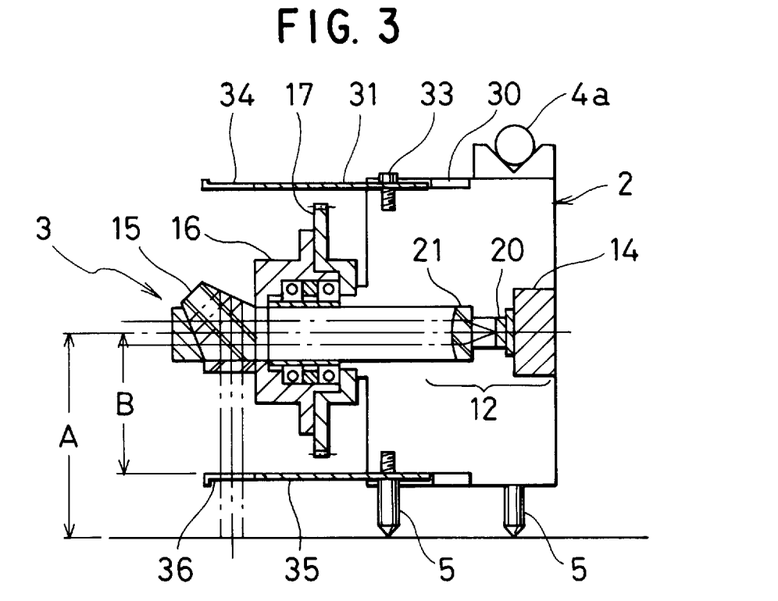
FIG. 3 is a lateral cross-sectional view of an essential portion of an embodiment of the present invention.
Figure 4:
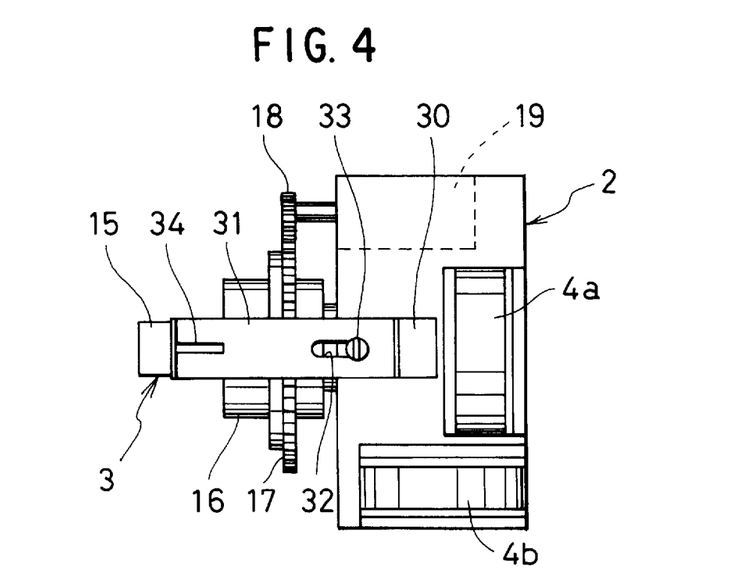
FIG. 4 is a plan view showing an essential portion of the above embodiment.
Figure 5:
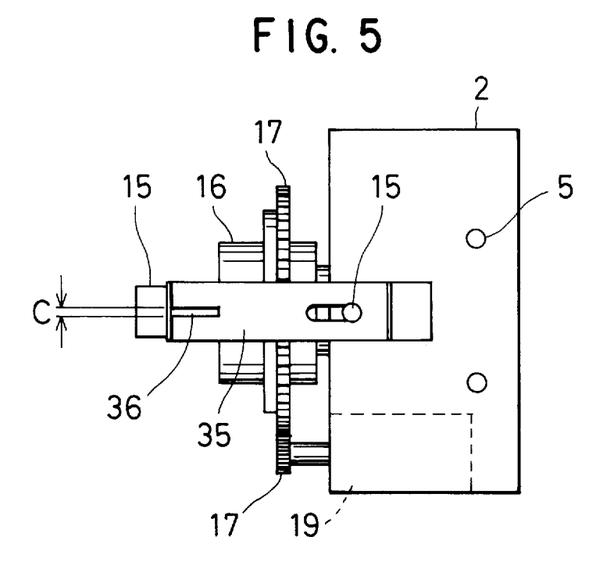
FIG. 5 is a bottom view of an essential portion of the above embodiment.

FIGS. 3 to 5 each represents an essential portion of the laser leveling device by removing the casing.

As already explained, the laser leveling device comprises a main unit 2 and a rotating unit 3.

First, the rotating unit 3 is described. A rotation support 16 is rotatably mounted on the main unit 2. On the rotation support 16, a pentagonal prism 15 is arranged and a driven gear 17 is concentrically provided. A driving gear 18 mounted on the output shaft of the scanning motor 19 is engaged with the driven gear 17. The pentagonal prism 15 deflects the light beam emitted in the direction of the rotation axis to a direction perpendicular to the rotation axis and allows a part 10c of the light beam to pass.

Next, the main unit 2 comprises a light emitting unit 12 having an optical axis aligned with the rotation axis of the rotation support 16 and a control circuit (not shown) in it. The light emitting unit 12 comprises an optical system 21 having a laser diode 20 driven by a laser oscillator 14 and a collimator lens, etc., and the laser beam emitted from the laser diode 20 is emitted toward the pentagonal prism 15 as parallel beams.

On the top surface of the main unit 2, a guide groove 30 in parallel to the rotation axis of the pentagonal prism 15 is formed, and an upper slit plate 31 is slidably engaged in the guide groove 30. The upper slit plate 31 has an elongated hole 32 at its base and is fixed on the main unit 2 by a bolt 33, which is inserted through the elongated hole 32. Further, at the forward end of the upper slit plate 31, a slit hole 34 is formed, which is positioned right above and in parallel to the rotation axis of the pentagonal prism 15.

On the lower surface of the main unit 2, a lower slit plate 35 is slidably mounted in parallel to the rotation axis of the pentagonal prism 15 in similar manner to the upper slit plate 31. The lower slit plate 35 is fixed by screwing the leg 5 into the main unit 2. On the forward end of the lower slit plate 35, a slit hole 36 is formed, which is right below and in parallel to the rotation axis of the pentagonal prism 15.

Figure 7:
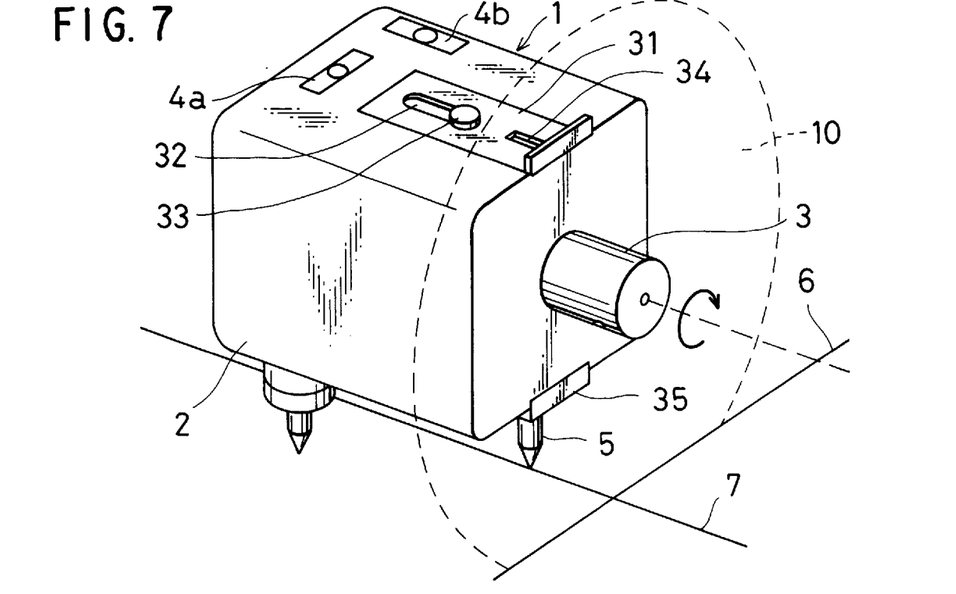
FIG. 7 is a perspective view showing operation of the device of the present invention.
Figure 8:
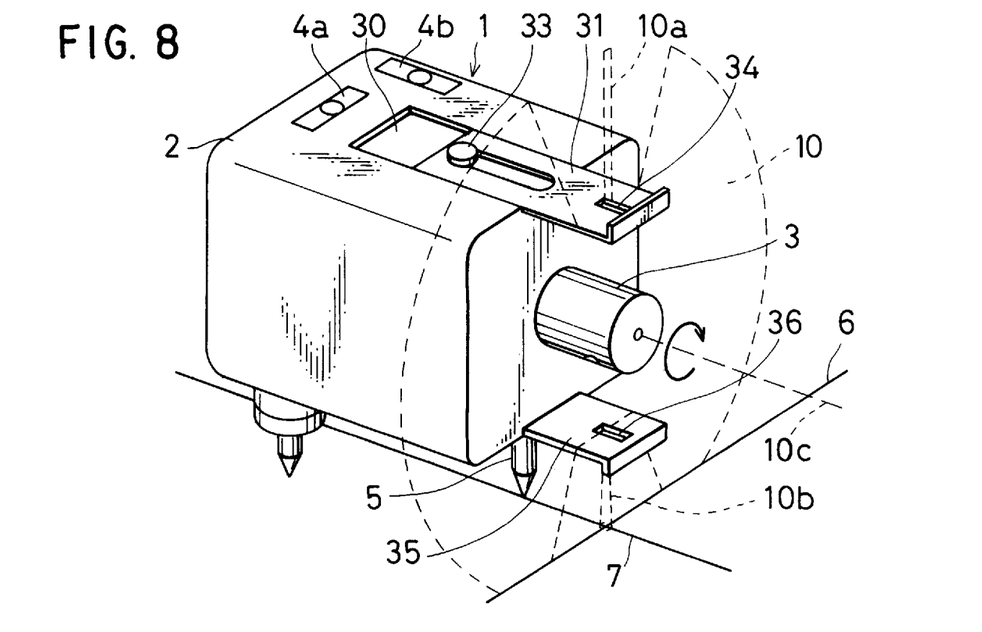
FIG. 8 is a perspective view showing operation of the device of the present invention.

In the following, description will be given on operation of the device, referring to FIGS. 7 and 8.

The bolt 33 and the leg 5 are loosened to move the upper slit plate 31 and the lower slit plate 35 backward, and these slit plates are fixed by tightening the bolt 33 and the leg 5 again. The upper slit plate 31 and the lower slit plate 35 should not interfere with the laser beam 10. Further, the leg 5 is adjusted to install the main unit 2 in horizontal position using bubble tubes 4a and 4b.

By driving the laser oscillator 14, the laser beam is emitted from the light emitting unit 12. A part of the parallel laser beam emitted from the light emitting unit 12 passes through the pentagonal prism 15, and the remaining part of the laser beam is deflected in a direction perpendicular to the optical axis by the pentagonal prism 15 and is emitted from the rotating unit 3. The pentagonal prism 15 is rotated by the scanning motor 19 via the driving gear 18 and the driven gear 17. By scanning of the laser beam emitted through the pentagonal prism 15, a vertical reference plane is formed.

To align the scanning locus of the laser beam 10 with the marking line 6, the bolt 33 and the leg 5 are loosened to pull out the upper slit plate 31 and the lower slit plate 35 so that the laser beam 10 crosses and passes through the slit holes 34 and 36.

Because the upper slit plate 31 and the lower slit plate 35 are present, the laser beam 10 emitted from the rotating unit 3 is interrupted before and after the slit holes 34 and 36. As a result, the laser beam 10 passing through the slit holes 34 and 36 is turned to spot lights 10a and 10b, which are emitted in vertical direction upward and downward respectively.

To easily install the laser leveling device 1, the spot light 10b is first aligned with the point of intersection of the marking lines 6 and 7 under the light emitting condition as described above and the locus on the floor as effected by scanning of the laser beam is aligned with the marking line 6. It is needless to say that no special operation is required such as stopping of the rotation of the rotating unit 3 or rotating it at low speed to install the laser leveling device 1.

Further, a part of the laser beam 10, i.e. the light beam 10c, emitted in axial direction of the rotating unit 3 projects a point, i.e. the point of intersection of the light beam 10c and the marking line 6, on wall surface.

Here, the relationship between the spot lights 10a or 10b and the lower slit plate 35 is described. In the setting of the laser leveling device 1, if we assume that the distance from optical axis of the light emitting unit 12 to ground surface is A, the distance from the optical axis to the lower slit plate 35 is B, and the width of the slit hole 36 is C, then the width of laser irradiation on the ground surface is given as:

$$D = (C/B) \times A \qquad (1)$$

If the slit width with respect to the diameter of the emitted light beam is taken into account, the irradiated laser hole on the ground surface is turned to a point. Showing an example by substituting numerical values, if it is assumed that A=100 mm, B=50 mm, and C=0.5 mm, then D is obtained from the equation (1) as:

$$D=(0.5 \text{ mm}/50 \text{ mm}) \times 100 \text{ mm}=1 \text{ mm} \qquad (2)$$

Here, if the width of the irradiated laser beam is set to 1 mm, the laser irradiation projected on the ground surface is approximately in spot-like shape.

In case the laser leveling device 1 is tilted at the time of installation, the position of the slit hole 36 is deviated in the vertical downward direction from the point of intersection. Thus, the position of the irradiation spot is deviated in the vertical downward direction from the point of intersection. As a result, it is possible to obtain an accurate and stable irradiation spot by adjusting the device in horizontal position using the bubble tubes 4a and 4b.

With regard to tilting of the light emitting unit 12 within the vertical plane including the optical axis, the optical axis itself is compensated. Thus, even when the slit hole is tilted, the irradiation spot does not move.

With regard to tilting within a plane perpendicular to the optical axis, the irradiation spot moves as described above. For example, if the leveling of the device is adjusted using a bubble tube of 1'/1 div., even when there is a reading error of one graduation, the spot moves by 0.03 mm in case A=100 mm, as described above, and this causes no trouble in practical operation.

As described above, it is designed that the slit plates 31 and 35 can be moved in and out with respect to the vertical laser irradiation plane. Therefore, when lower marking operation is performed after the installation of the device, the light beam is not hindered and no trouble occurs in the operation.

Further, for the purpose of the positioning operation only of the laser leveling device 1, the upper slit plate 31 is not required. By providing the upper slit plate 31, the device can be turned to a rotary laser device equipped with a vertical unit. By adopting the upper slit plate 31, it is possible to attain the purpose with high accuracy, i.e. to irradiate the spot light 10a in vertical upward direction, to project ground marking on ceiling, or to align in vertical direction.

The extent of interruption of the spot light by the upper slit plate 31 and the lower slit plate 35 to form the spot lights 10a and 10b is determined by adequately selecting the widths of the upper slit plate 31 and the lower slit plate 35. Further, it is needless to say that the slit plates can be provided on lateral sides of the main unit 2.

Figure 6:
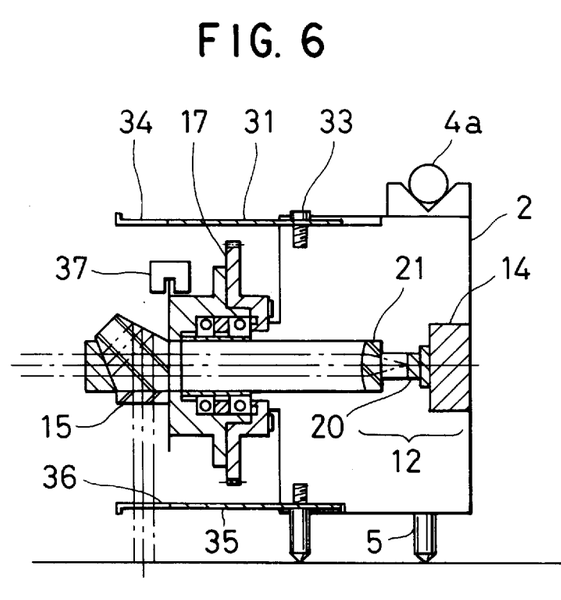
FIG. 6 is a lateral cross-sectional view of an essential portion of another embodiment of the invention.

In FIG. 6, an encoder 37 is provided on the rotation support 16 of the above embodiment. By this encoder 37, it is possible to control position and range of the scanning. Similarly to the case where the slit plate 35 is arranged face-to-face to the laser irradiation plane rotated and irradiated, the laser spot can be obtained by arranging the slit plate 35 at the desired position and to perform reciprocal scanning toward the slit plate 35. Under this condition, an irradiation spot with higher luminance can be attained by utilizing the scanning laser irradiation beam having partially high average luminance.

As described above, it is possible according to the present invention to perform positioning of the laser leveling device in simplified arrangement and without requiring special operation and to align the vertical laser plane formed by the laser leveling device with the desired position with high accuracy.

We claim:

1. A laser leveling device, comprising a light emitting unit for irradiating a laser beam, a rotating unit for rotating said laser beam for scanning, and means for turning on and off said laser beam within a given angular range so that a laser marker is formed in a specific direction, wherein said laser beam turn on and off means comprises an angle detector for detecting an angle of the rotating unit, and a control unit for performing on and off control of the light emitting unit based on a signal from said angle detector.

2. A laser leveling device according to claim 1, wherein the laser beam is turned off within a given angular range before and after a specific direction to form a spot light.

3. A laser leveling device according to claim 1, wherein the laser beam is turned off so that a spot is formed in a specific direction.

4. A laser leveling device according to one of claims 1, 2, or 3, wherein the laser beam is reciprocally scanned within a given angle before and after the formed spot.

5. A laser leveling device according to claim 1, wherein said specific direction is at least one of vertical downward direction, vertical upward direction or horizontal direction.

* * * * *